United States Patent [19]

Winter

[11] Patent Number: 4,516,491
[45] Date of Patent: May 14, 1985

[54] ROLL CROSS-AXIS MECHANISM
[75] Inventor: William J. Winter, Trumbull, Conn.
[73] Assignee: USM Corporation, Farmington, Conn.
[21] Appl. No.: 537,596
[22] Filed: Sep. 30, 1983
[51] Int. Cl.³ .............................................. B30B 3/04
[52] U.S. Cl. .................................. 100/158 R; 72/243; 425/366; 308/2 R
[58] Field of Search .............. 100/158 R, 162 B, 168; 68/108; 72/233, 240, 243, 248; 425/366, 367; 308/2 R

[56] References Cited
U.S. PATENT DOCUMENTS 2,965,920  12/1960  Whittum ......................... 100/158 R
3,240,148   3/1966  Varga ............................. 100/158 R
3,273,199   9/1966  Kleinewefers .................. 100/158 R
4,029,367   6/1977  Schwede et al. ................ 308/2 R
4,348,952   9/1982  Gooch ............................. 72/243 X FOREIGN PATENT DOCUMENTS
700107  12/1964  Canada ........................... 100/158 R Primary Examiner—Peter Feldman
Attorney, Agent, or Firm—Vincent A. White

[57] ABSTRACT

A cross axis roll adjusting mechanism including anti-friction bearing units arranged between a roll journal box and operating devices in a support frame to permit easy cross axis adjustment of a roll as well as a friction floating movement of the adjusted roll.

2 Claims, 2 Drawing Figures

ROLL CROSS-AXIS MECHANISM

FIELD OF THE INVENTION

This invention relates to mechanism for cross axis adjustment of cooperating rolls to correct the nip gap between the rolls to compensate for bending.

DESCRIPTION OF THE PRIOR ART

In the field of calendering or otherwise processing sheet material between two or more cooperating rolls, it is known to adjust the gap or nip between two rolls by crossing the axes of the rolls to compensate for bending of the rolls under pressure. Such adjusting mechanisms are shown in Canadian Pat. No. 700107 and U.S. Pat. Nos. 3,240,148; 3,273,199, 2,965,920 and 4,348,952. In U.S. Pat. No. 2,965,920 there is shown a cross axis adjusting mechanism in which the opposite ends of a roll are moved in opposite directions to cross the axes of a pair of otherwise aligned rolls. The bearings for the roll ends are moved generally normal to a plane intersecting the axes of both rolls of the set by rotation of ring nuts which run on threaded portions of vertical guide members for the opposite ends of one of the rolls. That patent also shows an alternate form in which only one side of each bearing is adjusted by a nut and thread device and the other side of each bearing is pressed by a fluid pressure cylinder toward the center of the bearing axis so as to follow the adjustment of the bearing. The guide surfaces are cylindrical so as to prevent axial movement of the bearings and the roll. That patent as well as the other patents show vertical guide surfaces which provide for limited movement of the adjusted roll toward its cooperating roll under limited load conditions.

Accordingly, it is a general object of the invention to provide anti-friction guide surfaces which permit floating as well as adjusting movements of the roll bearings under heavy load conditions.

SUMMARY OF THE INVENTION

There is provided anti-friction semi-cylindrical bearings guiding a roll journal for cross-axis adjustment and bodily movement toward and away from a cooperating roll. The adjusted roll is also guided for freely movable floating action relative to the cooperating roll.

DESCRIPTION OF THE PREFERRED EMBODIMENT

Figure 2:
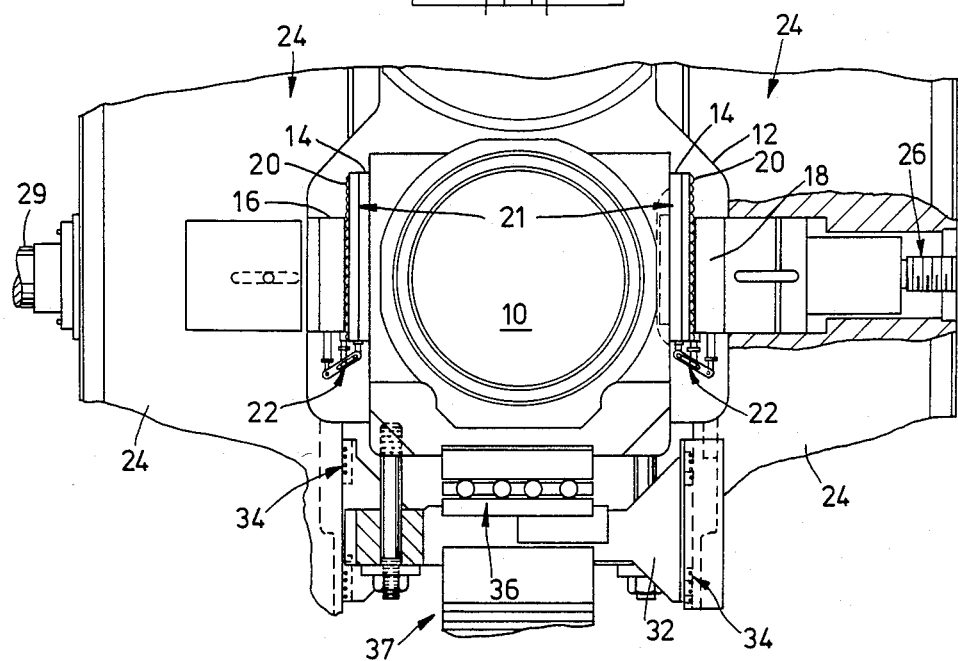
FIG. 2 is an end view of the mechanism shown in FIG. 1 partly in section.

In the drawings there is shown one end of a support for a calender roll 10 which is rotatable in a main journal box 12. The box has fixed thereto at opposite sides blocks 14 each having a convex semi-cylindrical surface located between blocks 16 and 18 each having a semi-cylindrical concave surface with a semi-cylindrical ball cage 20 interposed between each set of blocks 14 and 16 and 18, respectively. Each set of blocks 14, 16 and 18 and ball cages 20 form anti-friction bearings 21 for guiding the journal box 12 in vertical directions (as seen in FIG. 2) while restraining the journal boxes and the roll against axial movement. The pairs of race blocks 14 and 16 and 18 and the cages 20 are held together by swivel linkages 22 which permit relative movement between the blocks and ball cages.

Figure 1:
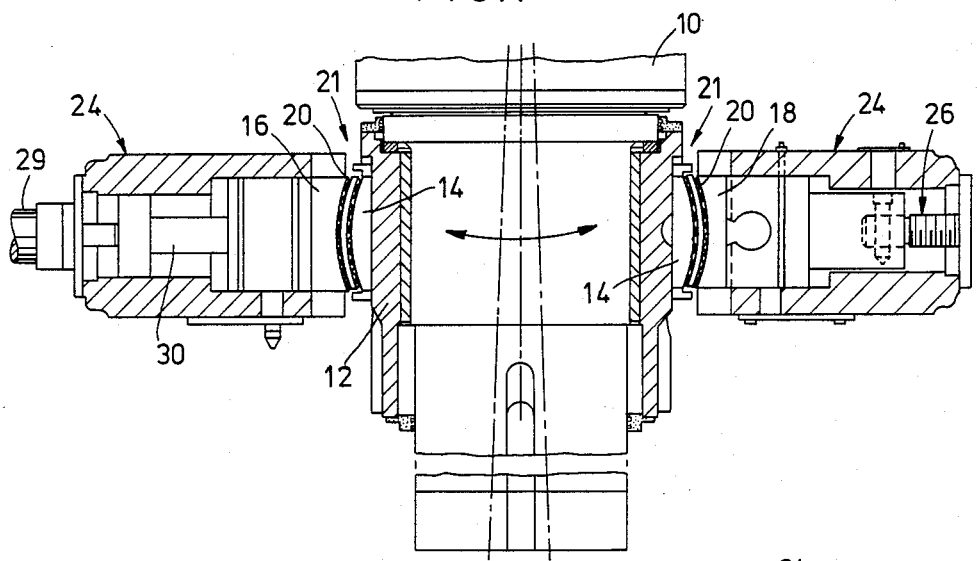
FIG. 1 is a plan view of one end of a roll bearing incorporating the invention.

For adjusting the cross axis disposition of each end of the roll, the blocks 18 are each keyed to the roll frame 24 to maintain the cylindrical race surface in its vertical disposition while permitting inward and outward horizontal movements as seen in FIG. 2. The block 18 is moved in and out by a screw actuator 26 which may be of any well known types incorporating a driven screw and being connected between the frame and the block 18. Obviously, linear movement may be provided by other types of actuators using rack and pinion mechanisms or levers all manual or power operated (to name only two available types) without departing from the scope of the invention. The blocks 16 also are keyed to the frame 24 for movements similar to the blocks 18. The blocks 16 however are actuated in linear directions by a fluid operated cylinder 29 of which a piston rod 30 is shown in FIG. 1. The movement of the blocks 18 is adapted to follow any movement of the block 18 and its bearing. Obviously, any convenient mechanism other than a piston cylinder device 29, 30 could be used to move the block 16 and its associated bearing.

The journal box is also secured to a slide 32 mounted for vertical movement in the frame 24 with roller bearings 34 being arranged between the frame and the slide. For fine adjusting the height of roll 10 or spacing relative to its opposing roll (not shown) a roller bearing 36 permitting relative horizontal movement between the journal box and the slide is arranged to be adjusted vertically (as seen in FIG. 2) by any well known screw devices 37 as not shown in detail but for example shown and described in said U.S. Pat. No. 2,965,920 which is incorporated herein by reference. Thus, as described above, each end of the roll 10 may be adjusted in horizontal cross axis directions by the actuators 26 and 30 and in vertical directions by the actuator 37. After adjustment, the roll 10 and its journal box is easily movable heightwise so as to float with respect to its opposing roll on the anti-friction bearings 21 and 34.

It should be apparent that a variety of mechanisms and combination of parts may be substituted for those described without departing from the scope of the invention as defined by the appended claims.

I claim:

1. In a calender roll machine having a pair of opposed rolls one of which is mounted at opposite ends in journals which are adjustable in cross axis directions to compensate for roll bending, and also adjustable in directions toward and away from a cooperating roll, the improvement comprising semi-cylindrical anti-friction bearings at opposite sides of the journal between means for adjusting the journal in cross axis directions, and means between a slide and the journal for adjusting the journal and the one roll toward and away from the cooperating roll the slide being mounted in a frame by anti-friction linear bearings for permitting free floating movement of said one roll on the first named and second named bearings toward and away from the cooperating roll without affecting the cross-axis adjustment.

2. A machine according to claim 1 in which the slide and journal are mounted in the frame for unitary floating movements with respect to the cooperating roll.

* * * * *